United States Patent
Numazawa (10) Patent No.: US 10,252,725 B2
(45) Date of Patent: Apr. 9, 2019

(54) VEHICLE STOP APPARATUS

(71) Applicant: Fuji Jukogyo Kabushiki Kaisha, Tokyo (JP)

(72) Inventor: Koji Numazawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 195 days.

(21) Appl. No.: 15/387,425

(22) Filed: Dec. 21, 2016

(65) Prior Publication Data

US 2017/0267255 A1 Sep. 21, 2017

(30) Foreign Application Priority Data

Mar. 18, 2016 (JP) ................... 2016-055898

(51) Int. Cl.
| | |
|---|---|
| G01C 21/00 | (2006.01) |
| B60W 50/10 | (2012.01) |
| B60W 10/18 | (2012.01) |
| B60W 10/20 | (2006.01) |
| B60W 50/08 | (2012.01) |
| B60K 28/00 | (2006.01) |
| B60N 2/75 | (2018.01) |

(52) U.S. Cl.
CPC ............ *B60W 50/10* (2013.01); *B60K 28/00* (2013.01); *B60N 2/797* (2018.02); *B60W 10/18* (2013.01); *B60W 10/20* (2013.01); *B60W 50/082* (2013.01); *B60W 2540/04* (2013.01); *B60Y 2302/05* (2013.01)

(58) Field of Classification Search
CPC .... B60W 50/10; B60W 10/18; B60W 50/082; B60W 10/20; B60W 2540/04; B60N 2/797; B60K 28/00; B60Y 2302/05
See application file for complete search history.

(56) References Cited

U.S. PATENT DOCUMENTS

| | | | |
|---|---|---|---|
| 9,994,233 B2* | 6/2018 | Diaz-Jimenez | B60W 50/10 |
| 10,029,676 B2* | 7/2018 | Kaufmann | B60W 30/00 |
| 10,073,460 B2* | 9/2018 | Downing | G05D 1/0088 |
| 2012/0062743 A1* | 3/2012 | Lynam | B60Q 9/005 348/148 |

(Continued)

FOREIGN PATENT DOCUMENTS

| | | |
|---|---|---|
| JP | H07-246130 A | 9/1995 |
| JP | H09-058426 A | 3/1997 |

(Continued)

OTHER PUBLICATIONS

Japanese Office Action dated Oct. 31, 2017 in Japanese Patent Application No. 2016-055898.

*Primary Examiner* — Ian Jen
(74) *Attorney, Agent, or Firm* — McGinn I.P. Law Group, PLLC.

(57) ABSTRACT

A vehicle stop apparatus includes a brake, an operation switch, and a controller. The brake stops a vehicle. The operation switch is provided at a location that allows the operation switch to be operable by a seated occupant of the vehicle with an upper limb of the occupant. The controller controls activation of the brake. The controller performs the activation of the brake in response to an input received by the operation switch, and thereby causes the brake to stop the vehicle.

20 Claims, 6 Drawing Sheets

(56) References Cited

U.S. PATENT DOCUMENTS

| | | | | |
|---|---|---|---|---|
| 2014/0156157 A1* | 6/2014 | Johnson | ................... | B60T 7/22 |
| | | | | 701/70 |
| 2015/0149035 A1* | 5/2015 | Enthaler | ............... | B60K 37/06 |
| | | | | 701/36 |
| 2015/0166062 A1* | 6/2015 | Johnson | ............... | B60W 30/12 |
| | | | | 701/41 |

FOREIGN PATENT DOCUMENTS

| JP | 2000-118275 A | 4/2000 |
|---|---|---|
| JP | 2001-080479 A | 3/2001 |
| JP | 2015-104936 A | 6/2015 |
| JP | 2015-178332 A | 10/2015 |
| JP | 2015-182526 A | 10/2015 |

\* cited by examiner

VEHICLE STOP APPARATUS

CROSS-REFERENCE TO RELATED APPLICATIONS

The present application claims priority from Japanese Patent Application No. 2016-055898 filed on Mar. 18, 2016, the entire contents of which are hereby incorporated by reference.

BACKGROUND

The technology relates to a stop apparatus used for a vehicle.

A general apparatus that stops a vehicle such as an automobile activates a brake device in response to pressing-down of a brake pedal by a driver. Another apparatus assists an operation of the driver to thereby automatically stop a vehicle in the event of an emergency or any other situation, addressing a reduction in the number of traffic accidents. There has also been an automatic driving assist apparatus that allows for automatic driving of a vehicle without any driving operation by a driver such as steering by the driver.

For example, Japanese Unexamined Patent Application Publication (JP-A) No. 2015-178332 discloses an automatic driving assist apparatus that allows for automatic driving without the aid of a driver's operation. The automatic driving assist apparatus includes a vehicle controlling electronic control unit (ECU) that controls all of an accelerator operation, a brake operation, and a steering operation which serve as operations related to behavior of a vehicle. The foregoing automatic driving assist apparatus disclosed in JP-A No. 2015-178332 controls and drives devices including an engine, a brake, and an electric power steering to perform the automatic driving until the necessity arises on a guide course that the automatic driving is to be halted.

SUMMARY

It is desirable that a driver be sufficiently away from members such as a steering and pedals at the time of automatic driving in a vehicle that allows for the automatic driving by an automatic driving assist apparatus, for the purpose of reducing driver's fatigue without interrupting operations such as steering involved in the automatic driving. Specifically, a driver's seat is moved rearward at the time of the automatic driving to allow the driver to be relaxed. Further, the driver's seat moved rearward may also be reclined, for example.

However, allowing the driver to be relaxed sufficiently away from the members such as the steering and the pedals may make it difficult for the driver to suddenly perform a driving operation when a sudden transition is made from the automatic driving to manual driving in the event of an emergency or any other situation.

Specifically, the driver may need to perform an operation of returning to a normal driving posture from a state in the seat moved rearward, reclined, etc., in order to operate the members such as the steering and the pedals. This may cause a delay in stopping of the vehicle. In order to avoid such a delay in stopping of the vehicle, it may be necessary for the driver to constantly have a posture that allows for the driving operation in preparation for the event of an emergency or any other situation, also at the time of the automatic driving. What is therefore desired is a stop apparatus that allows the driver to easily perform the operation even in a relaxed state at the time of the automatic driving or any other situation, and also allows the driver to promptly stop the vehicle.

Further, an operation unit for manually stopping the vehicle in the foregoing vehicle is only the brake pedal provided at a driver's seat. Hence, a fellow occupant of the vehicle other than the driver is unable to perform emergency stop of the vehicle, for example, even in a case where the driver becomes unable to perform the driving operation for a reason such as sleeping and occurrence of a seizure, a case where the fellow occupant senses a risk, etc. before the driver, or any other case. Accordingly, for the purpose of further improving safety of the vehicle, what is desired is a stop apparatus that is operable not only by the driver but also by the fellow occupant and allows also the fellow occupant to promptly stop the vehicle in the event of an emergency or any other situation.

It is desirable to provide a vehicle stop apparatus that makes it possible to promptly stop a vehicle through an easy operation in the event of an emergency or any other situation.

An aspect of the technology provides a vehicle stop apparatus that includes a brake, an operation switch, and a controller. The brake stops a vehicle. The operation switch is provided at a location that allows the operation switch to be operable by a seated occupant of the vehicle with an upper limb of the occupant. The controller controls activation of the brake. The controller performs the activation of the brake in response to an input received by the operation switch, and thereby causes the brake to stop the vehicle.

The controller may be capable of performing automatic driving that allows starting of traveling, stopping of the traveling, acceleration, deceleration, and steering of the vehicle to be performed automatically. The input received by the operation switch may be enabled while the automatic driving is performed by the controller.

The operation switch may include a plurality of operation switches. The controller may perform the activation of the brake upon detecting the input received by two or more of the operation switches.

The vehicle may include a seat and an armrest attached to the seat. The operation switch may be provided on the armrest.

The operation switch may include a plurality of operation switches. One or more of the operation switches may be provided on an inner side surface of the armrest. One or more of the operation switches, other than the one or more of the operation switches that are provided on the inner surface of the armrest, may be provided on a surface of the armrest other than the inner surface.

DETAILED DESCRIPTION

In the following, a vehicle stop apparatus according to one implementation of the technology is described in detail with reference to the accompanying drawings.

Figure 1:
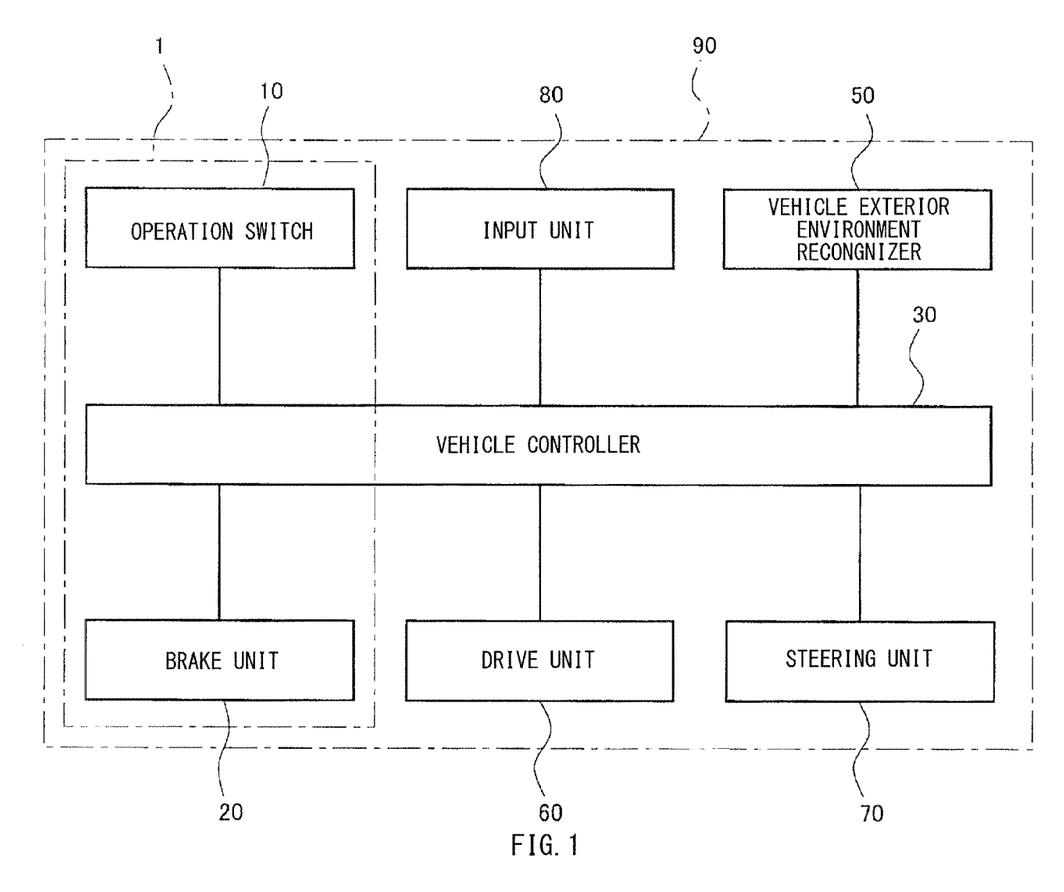
FIG. 1 is a block diagram illustrating an outline of a vehicle stop apparatus according to one implementation of the technology.

FIG. 1 is a block diagram illustrating an outline of a stop apparatus 1 for a vehicle 90. In one implementation, the stop apparatus 1 may serve as a "vehicle stop apparatus". Mounted on the vehicle 90, the stop apparatus 1 stops the traveling vehicle 90 in the event of an emergency or any other situation.

Referring to FIG. 1, the stop apparatus 1 includes an operation switch 10 with which an occupant of the vehicle 90 performs emergency stop of the vehicle 90. Non-limiting examples of the operation switch 10 may include a button. The operation switch 10 may be coupled to a vehicle controller 30 which will be described later. The occupant of the vehicle 90 may operate the operation switch 10, thereby causing a signal to be supplied to the vehicle controller 30.

The vehicle controller 30 may serve as a controller of the stop apparatus 1. For example, the vehicle controller 30 may be an electronic control unit (ECU) that includes a device such as a calculator that performs various calculations and operations. The vehicle controller 30 may be coupled to the operation switch 10 and a brake unit 20 which will be described later. The vehicle controller 30 may perform the various calculations and operations on the basis of the signal supplied from the operation switch 10, and thereby activate the brake unit 20.

The brake unit 20 may perform deceleration and stop the vehicle 90. For example, the brake unit 20 may be a brake, or any other suitable device, which is activated on the basis of a signal supplied from the vehicle controller 30. Pressing of the operation switch 10 by the occupant causes the vehicle controller 30 to activate the brake unit 20, thereby allowing for the stopping of the vehicle 90.

The vehicle controller 30 may also be coupled to an input unit 80, a vehicle exterior environment recognizer 50, a drive unit 60, a steering unit 70, a notifying device, any other unillustrated controller device, and any other device. The input unit 80 may be operable by the occupant. Non-limiting examples of the input unit 80 may include a touch panel and a switch such as a button. The vehicle exterior environment recognizer 50 may recognize an outside environment of the vehicle 90. Non-limiting examples of the vehicle exterior environment recognizer 50 may include a stereo camera and a radar unit. The drive unit 60 may be a source of power allowing for traveling of the vehicle 90. Non-limiting examples of the drive unit 60 may include an engine. The steering unit 70 may perform steering of the vehicle 90. Non-limiting examples of the steering unit 70 may include a steering. Non-limiting examples of the notifying device may be a multifunctional display.

The vehicle controller 30 may perform switching, on the basis of instructions supplied from the input device 80, between normal manual driving in which the driver performs the driving operation and the automatic driving in which the vehicle controller 30 performs the driving operation automatically. At the time of the automatic driving, the vehicle controller 30 may execute various calculations on the basis of information supplied from the devices including the vehicle exterior environment recognizer 50. By performing the various calculations, the vehicle controller 30 may monitor factors including a current state of traveling and the environment outside the vehicle 90. The vehicle controller 30 may further control the devices including the brake unit 20, the drive unit 60, and the steering unit 70 to perform the appropriate automatic driving in accordance with a current situation. The vehicle controller 30 may thus have the automatic driving function and may be able to perform the driving operation of the vehicle 90 automatically.

Figure 2:
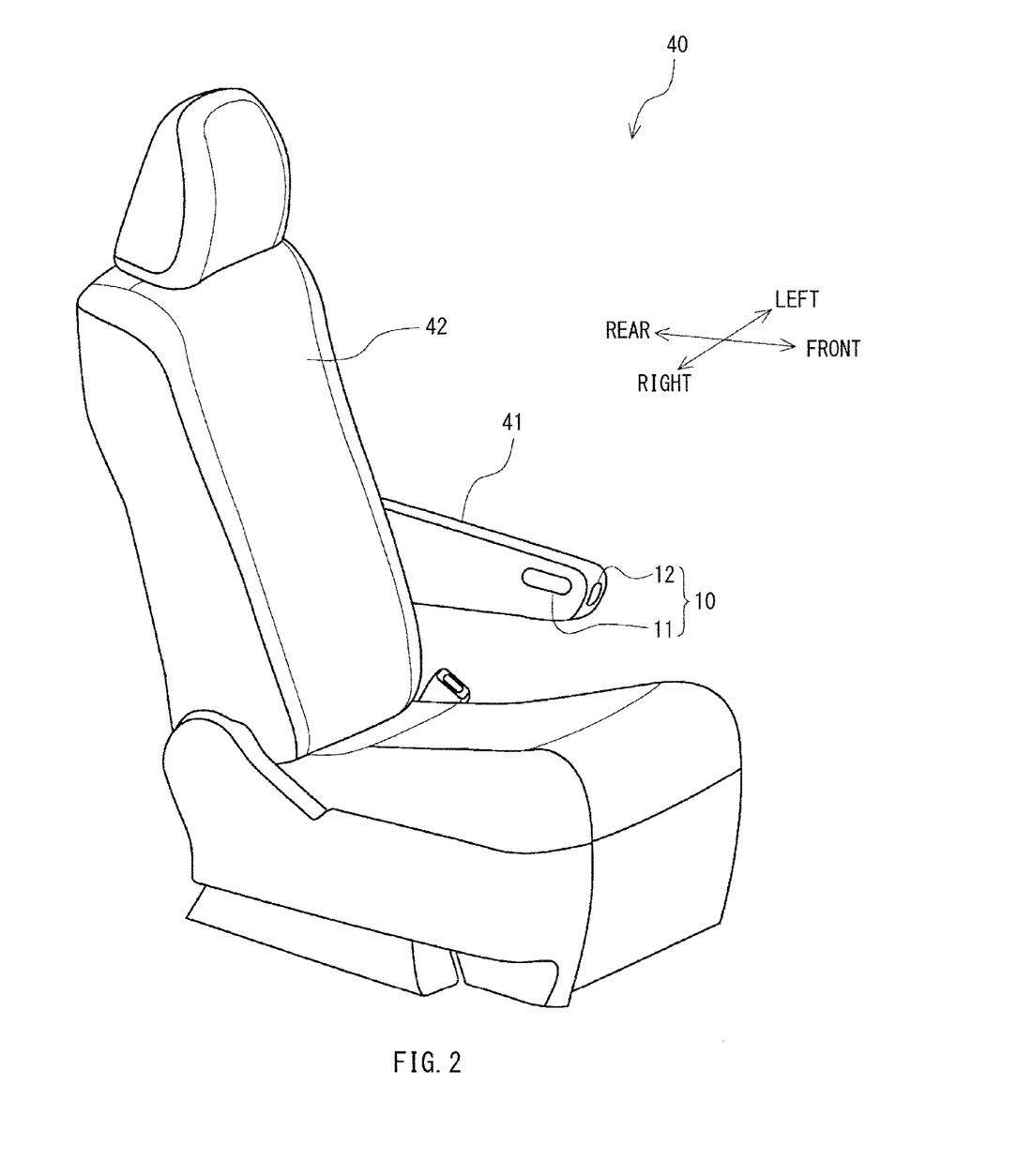
FIG. 2 is a perspective view of an example of a seat of a vehicle according to one implementation of the technology.

FIG. 2 is a perspective view of an example of a seat 40 of the driver's seat provided in the vehicle 90, seen from the front-right of the seat 40. Referring to FIG. 2, an armrest 41 may be attached onto the left side of the seat 40. The armrest 41 may be provided for the occupant seated in the seat 40 to place his/her left elbow on. The armrest 41 may be fixed onto a location such as a left side surface of a seat back 42 of the seat 40. Alternatively, the armrest 41 may be supported, in a pivotable manner, by the seat back 42. The armrest 41 may be provided on each of the right and left sides of the seat 40.

A front part of the armrest 41, i.e., the vicinity of an tip end of the armrest 41 may be provided with the operation switch 10 such as a button. This configuration allows the occupant to easily press the operation switch 10 with his/her upper limb. For example, the occupant may press the operation switch 10 with his/her upper limb such as his/her finger. Hence, it is possible for the occupant to promptly press the operation switch 10 upon determining that stopping of the vehicle 90 is necessary. In other words, it is possible for the occupant to promptly stop the vehicle 90 without pressing down an unillustrated brake pedal in the event of an emergency or any other situation.

The location to provide the operation switch 10 is not limited to the armrest 41 of the seat 40 of the driver's seat. For example, the operation switch 10 may be also provided on any other location such as an armrest of a navigator's seat and an armrest of a rear seat. This also allows, in addition to the driver seated in the driver's seat of the vehicle 90, for the occupant seated in the navigator's seat, the occupant seated in the rear seat, and the occupant seated in any other seat to press the operation switch 10 to thereby stop the vehicle 90. It is therefore possible to stop the vehicle 90 in the event of an emergency or any other situation, on the basis of monitoring and determination by the driver and other occupants, i.e., on the basis of monitoring and determination by a plurality of persons. This improves safety of the vehicle 90.

Specifically, the foregoing configuration may allow the fellow occupant to press the operation switch 10 to thereby safely stop the vehicle 90 without pressing down the brake pedal located in the front region of the driver's seat, for example, in a case where the driver is unable to perform the driving operation for a reason such as sleeping and occurrence of a seizure, a case where the fellow occupant senses a risk, etc. before the driver, or any other case. This may avoid occurrence of an accident which has been difficult to avoid, for example.

Moreover, a part that receives an input of an operation causing the stop apparatus 1 to perform the emergency stop of the vehicle 90, i.e., a part, of the stop apparatus 1, operated by the occupant to perform the emergency stop of the vehicle 90 may be the operation switch 10 such as a button. This configuration allows even an occupant having no skill or knowledge of driving to easily stop the vehicle 90 by pressing the operation switch 10.

Figure 3:
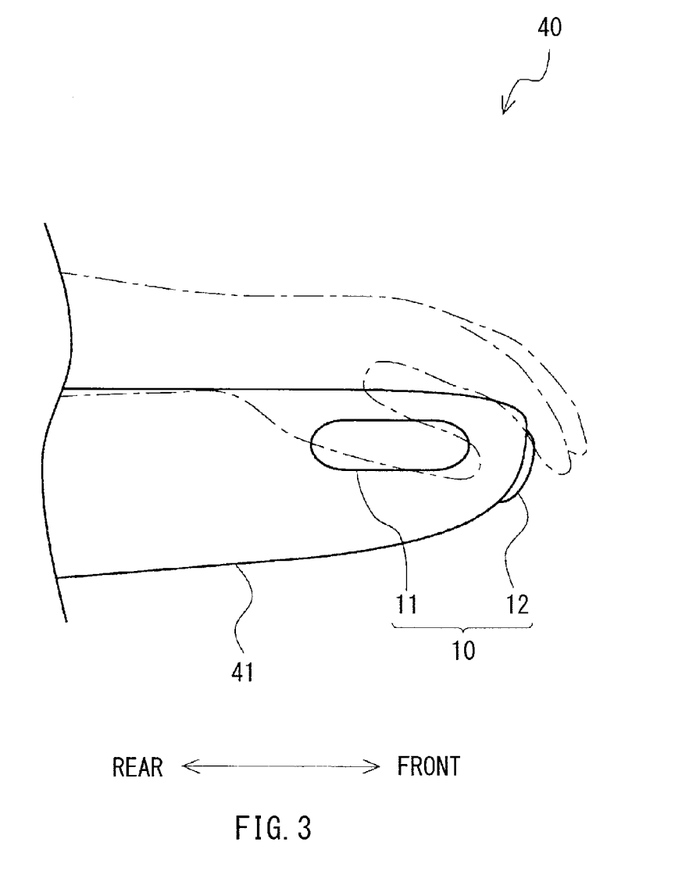
FIG. 3 is a side view of an example of an armrest of the vehicle according to one implementation of the technology.

FIG. 3 is a side view of an example of the armrest 41 of the seat 40 illustrated in FIG. 2. FIG. 3 includes a dashed-dotted line illustrating the left hand of the occupant seated in the seat 40. Referring to FIG. 3, the finger of the occupant may be placed in the vicinity of the operation switch 10 when the occupant seated in the seat 40 places his/her arm on the armrest 41.

The operation switch 10 provided in the vicinity of the tip end of the armrest 41 may include a first operation switch 11 and a second operation switch 12. In one implementation, the first operation switch 11 may serve as "one or more of the operation switches" that "are provided on an inner surface of the armrest". In one implementation, the second operation switch 12 may serve as "one or more of the operation switches, other than the one or more of the operation switches that are provided on the inner surface of the armrest on an occupant side" that "are provided on a surface of the armrest other than the surface". It is to be noted that the operation switch 10 may include three or more operation switches.

The first operation switch 11 may be provided on a right side surface of the armrest 41. The right side surface of the armrest 41 may be, in other words, a side surface, of the armrest 41, that is on the occupant side when the occupant is seated in the seat 40. This configuration allows the occupant to press the first operation switch 11 with his/her thumb.

The first operation switch 11 may have a shape that is longer in a front-rear direction. For example, the first operation switch 11 may have a substantially-elliptical shape or any other shape. This configuration allows the thumb of the occupant to be positioned in the vicinity of the first operation switch 11 irrespective of a factor such as the size of the hand of the occupant seated in the seat 40. It is therefore possible for the occupant to easily press the first operation switch 11.

The second operation switch 12 may be provided on a front surface of the armrest 41. The second operation switch 12 may be pressed by the occupant with one of his/her index finger, middle finger, and ring finger in a direction from the front of the armrest 41 to the rear of the armrest 41.

The occupant's thus placing his/her arm on the armrest 41 may spontaneously lead his/her fingers to be positioned in the vicinity of the respective first operation switch 11 and second operation switch 12. This makes it possible for the occupant to promptly operate each of the first operation switch 11 and the second operation switch 12.

The foregoing configuration of the stop apparatus 1 allows the occupant to promptly stop the vehicle 90 by pressing the operation switch 10 in the event of an emergency and any other situation, even when the occupant is away from the members such as the steering and the brake pedal, referring to FIG. 1.

In other words, applying the stop apparatus 1 having the foregoing configuration to the vehicle 90 makes it possible to so set, at the time of the automatic driving of the vehicle 90, the arrangement of the seat in which the hands, feet, and any other part of the driver are sufficiently away from the members such as the steering and the pedals. Such setting of the arrangement of the seat may be achieved by moving the seat 40 rearward, or by any other operation. As a result, it is possible to improve an effect of reducing the driver's fatigue while ensuring safety at the time of the automatic driving.

When the occupant senses a risk such as a collision, the occupant reflexively grasps, with his/her hand, a nearby object. In the present implementation, the hand of the occupant may be placed in the vicinity of the tip end of the armrest 41. The occupant may therefore reflexively grasp, with his/her hand, the vicinity of the tip end of the armrest 41 upon sensing a risk. The first operation switch 11 and the second operation switch 12 that are provided in the vicinity of the tip end of the armrest 41 may be therefore pressed by the occupant.

Thus providing the operation switch 10 in the vicinity of the tip end of the armrest 41 allows for prompt pressing of the operation switch 10, utilizing the reflexive action of the occupant. Hence, the sudden movement of the occupant may be promptly reflected to safely stop the vehicle 90 upon occurrence of a risk or any other situation.

As described above, the number of the operation switch 10 provided on the armrest 41 may be two or more. Specifically, the armrest 41 may be provided with the first operation switch 11 and the second operation switch 12. On the basis of this configuration, the brake unit 20 may be activated only when both the first operation switch 11 and the second operation switch 12 are pressed in one implementation, for example, as will be described in detail with reference to FIG. 4B. This makes it possible to avoid unnecessary emergency stopping of the vehicle 90 attributed to unintentional pressing of the operation switch 10.

In other words, the foregoing configuration makes it possible to prevent the brake unit 20 from being activated in a case such as a case where the operation switch 10 is pressed unintentionally. Specifically, the foregoing configuration makes it possible to prevent the brake unit 20 from being activated in a case such as a case where only one of the first operation switch 11 and the second operation switch 12 is pressed accidentally.

Further, for the purpose of preventing unintentional operation of the stop apparatus 1, for example, a factor such as a time period during which both the first operation switch 11 and the second operation switch 12 are kept being pressed may be measured in addition to detecting whether the first operation switch 11 and the second operation switch 12 are pressed together. A result of the foregoing measurement may be utilized to prevent the unintentional operation of the stop apparatus 1. This will be described later in detail with reference to FIG. 5.

The operation switch 10 may be provided on the front surface and the side surface of the armrest 41 in the present implementation. However, the location of the operation switch 10 is not limited thereto. Alternatively, for example, the operation switch 10 may be provided on a lower surface of the armrest 41. Alternatively, the operation switch 10 may be so provided inside a skin material of the armrest 41 that the operation switch 10 is hidden from the outside of the armrest 41. Thus providing the operation switch 10 on the lower surface of the armrest 41 or inside the skin material of the armrest 41 may prevent the operation switch 10 from being conspicuous, making it possible to maintain quality of design of the armrest 41.

Conversely, the operation switch 10 may so protrude greatly from the surface of the armrest 41 that the operation switch 10 is conspicuous. This configuration may clearly notify the existence of the operation switch 10 provided for emergency stop of the vehicle 90 to the occupant. It is therefore possible to suppress occurrence of unintentional operation attributed to unintentional pressing of the operation switch 10 by the occupant, or occurrence of any other unintentional operation.

The operation switch 10 is not limited to the button. For example, a pressure sensitive sensor may be provided in the vicinity of the tip end of the armrest 41 to serve as the operation switch 10. Further, a factor such as intensity, a direction, and displacement of pressing of the operation switch 10 may be detected. A result of the detection may be utilized in making a control determination as to whether the brake unit 20 is to be activated. The foregoing method may also avoid unnecessary emergency stop of the vehicle 90 attributed to unintentional operation.

Referring to FIGS. 4A to 6, a control operation of the stop apparatus 1 illustrated in FIGS. 1 to 3 is described below in detail.

Figure 4A:
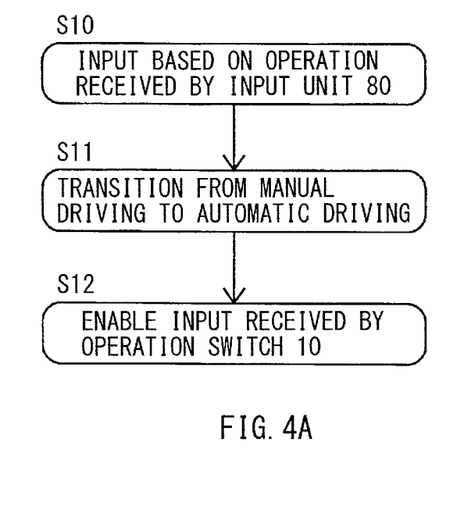
FIG. 4A is a flowchart illustrating an example of a control operation of the vehicle stop apparatus according to one implementation of the technology.
Figure 4B:
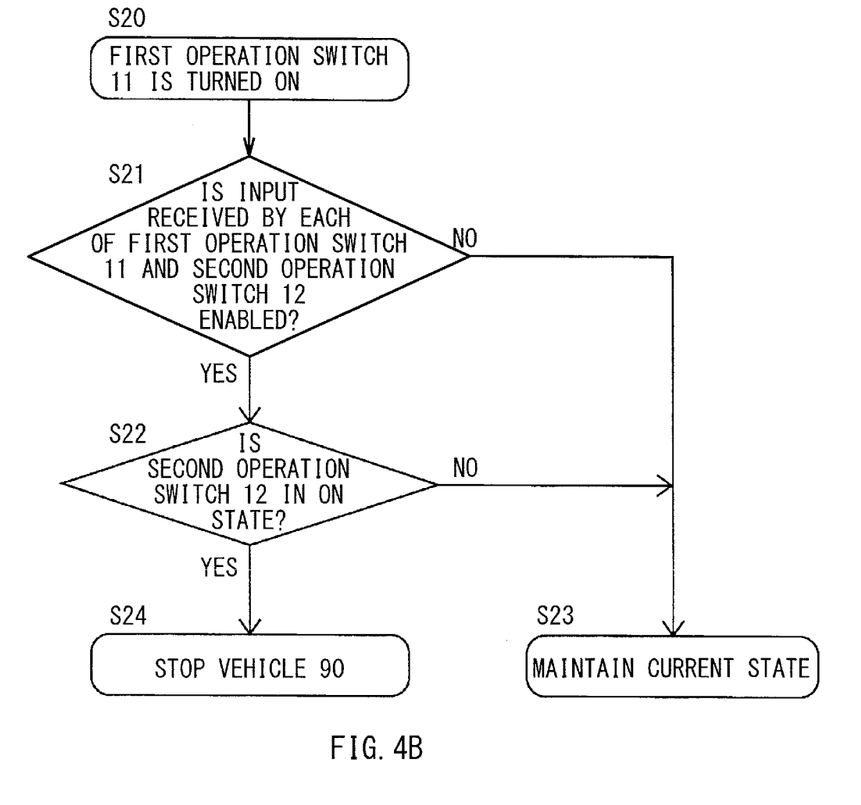
FIG. 4B is a flowchart illustrating another example of the control operation of the vehicle stop apparatus according to one implementation of the technology.

FIG. 4A is a flowchart illustrating an example of the control operation of the stop apparatus 1. FIG. 4B is a flowchart illustrating another example of the control operation of the stop apparatus 1. Referring to FIG. 4A, in step S10, the occupant may operate the input unit 80, thereby giving instructions, to the vehicle controller 30, to make a transition from the manual driving to the automatic driving.

In response to the foregoing operation, in step S11, the vehicle controller 30 may execute the various calculations, and upon determining that conditions which allow the automatic driving are satisfied, make the transition from the manual driving to the automatic driving.

Upon making the transition from the manual driving to the automatic driving, the vehicle controller 30 may perform a movement control of the seat 40. The movement control of the seat 40 may include moving the seat 40 rearward. The vehicle controller 30 may also perform a control for the automatic driving on each of the devices such as the brake unit 20, the drive unit 60, and the steering unit 70, on the basis of information supplied from devices such as the exterior environment recognizer 50.

Thereafter, in step S12, the vehicle controller 30 may enable the input received by the operation switch 10. Setting the input of the operation switch 10 to be enabled on the basis of the forgoing control operation makes it possible to permit to activate the brake unit 20 with the operation switch 10 only at the time of the automatic driving.

Specifically, when the operation switch 10 is pressed while the input received by the operation switch 10 is set to be enabled as described above, the vehicle controller 30 may activate the brake unit 20 to thereby perform the emergency stop of the vehicle 90. It is to be noted that the vehicle controller 30 does not stop the vehicle 90 even when the operation switch 10 is pressed, while the input received by the operation switch 10 is disabled. This configuration prevents unnecessary activation of the brake unit 20 attributed to unintentional operation of the operation switch 10 at the time of the normal manual driving in which the driver performs the driving operation.

It is to be noted that, upon the enabling of the input received by the operation switch 10, for example, only the input received by the operation switch 10 provided on a particular seat may be enabled instead of enabling the input received by the operation switch 10 provided on all of the seats.

Referring to FIG. 4B, another example of the control operation is described. In step S20, the occupant may press the first operation switch 11 to turn on the first operation switch 11, thereby supplying the signal to the vehicle controller 30.

Thereafter, in step 21, the vehicle controller 30 may determine whether the input received by the operation switch 10 is enabled. Specifically, the vehicle controller 30 may determine whether the input received by each of the first operation switch 11 and the second operation switch 12 is enabled. It is to be noted that whether the input received by the operation switch 10 is enabled may be set through the control operation performed in the process from step S10 to step S12 illustrated in FIG. 4A, depending on whether the automatic driving is performed.

When the vehicle controller 30 determines that the input received by the operation switch 10 is disabled in step S21 illustrated in FIG. 4B, i.e., when a result of the determination made in step S21 is NO, a process in step S23 may be executed. The vehicle controller 30 may thus maintain the current state. Specifically, the vehicle 90 may maintain the current traveling state without being subjected to the emergency stop.

In contrast, when the vehicle controller 30 determines that the input received by the operation switch 10 is enabled, i.e., when the result of the determination made in step S21 is YES, the vehicle controller 30 may make a determination in step S22. Specifically, the vehicle controller 30 may determine whether the second operation switch 12 is in an ON state.

When the vehicle controller 30 determines that the second operation switch 12 is in an OFF state in step S22, i.e., when a result of the determination made in step S22 is NO, the process in step S23 may be executed. The vehicle 90 may therefore maintain the current traveling state without being subjected to the emergency stop.

In contrast, when the vehicle controller 30 determines that the second operation switch 12 is in the ON state in step S22, i.e., when the result of the determination made in step S22 is YES, the vehicle controller 30 may give the brake unit 20 instructions to stop the vehicle 90 in step S24. The brake unit 20 may operate in accordance with the instructions given from the vehicle controller 30, to thereby stop the vehicle 90.

In the foregoing control example, whether the first operation switch 11 and the second operation switch 12 are pressed substantially together may be determined for each of the first operation switch 11 and the second operation switch 12 to determine whether the emergency stop of the vehicle 90 is necessary. The order of making the determination is not limited to the order adopted in the foregoing control example. Alternatively, the order adopted in the foregoing control example may be reversed. Specifically, pressing of the second operation switch 12 may be detected before a determination is made as to whether the first operation switch 11 is pressed.

In the control example illustrated in FIG. 4B, the vehicle controller 30 may activate the brake unit 20 to thereby stop the vehicle 90, when the first operation switch 11 is pressed and the second operation switch 12 is also pressed as described above. Such a control makes it possible to avoid unintentional emergency stop of the vehicle 90 attributed to the unintentional operation performed on the operation switch 10.

Accordingly, the emergency stop of the vehicle 90 may not be executed when the occupant unintentionally presses only one of the first operation switch 11 and the second operation switch 12. In contrast, when the occupant reflexively grasps the armrest 41 in the event of an emergency or any other situation, the respective first operation switch 11 and second operation switch 12 may be pressed with the fingers of the occupant substantially together, causing the vehicle controller 30 to perform the emergency stop of the vehicle 90.

Figure 5:
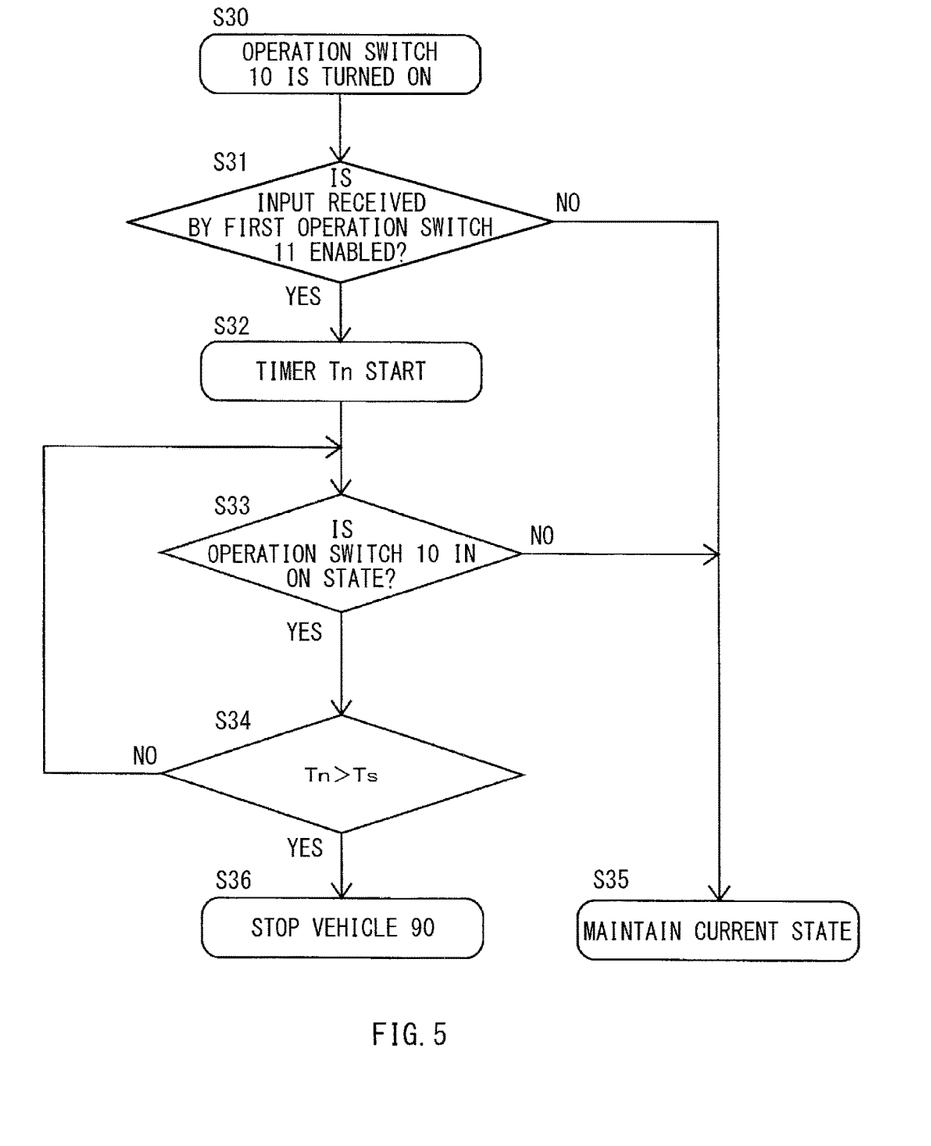
FIG. 5 is a flowchart illustrating a modification of the control operation of the vehicle stop apparatus according to one implementation of the technology.

FIG. 5 is a flowchart illustrating a modification of the control operation of the stop apparatus 1. Referring to FIG. 5, in step S30, the occupant may press the operation switch 10 to turn on the operation switch 10, thereby supplying the signal to the vehicle controller 30.

In step S31, the vehicle controller 30 may determine whether the input received by the operation switch 10 is enabled. When the vehicle controller 30 determines that the input received by the operation switch 10 is disabled, i.e., when a result of the determination made in step S31 is NO, the process may proceed to step S35. The vehicle controller 30 may therefore maintain the current traveling state of the vehicle 90 without stopping the vehicle 90.

In contrast, when the vehicle controller 30 determines that the input received by the operation switch 10 is enabled, i.e., when the result of the determination made in step S31 is YES, in step S32, the vehicle controller 30 may turn on an unillustrated timer to thereby start measurement of elapsed time Tn. The unillustrated timer may be provided inside the vehicle controller 30. Specifically, the timer may count the elapsed time Tn from the time when the operation switch 10 has been pressed.

Thereafter, in step S33, the vehicle controller 30 may determine whether the operation switch 10 is in the ON state, i.e., whether the operation switch 10 is kept being pressed. When the vehicle controller 30 determines that the operation switch 10 is in the OFF state, i.e., when a result of the determination made in step S33 is NO, the process may proceed to step S35. The vehicle controller 30 may therefore maintain the current traveling state of the vehicle 90 without stopping the vehicle 90.

In contrast, when the vehicle controller 30 determines that the operation switch 10 is in the ON state, i.e., when the result of the determination made in step S33 is YES, the vehicle controller 30 may perform a process in the step S34 thereafter. Specifically, the vehicle controller 30 may read, from the timer, the elapsed time Tn from the time when the operation switch 10 has been pressed, and thereby make a comparison between predetermined reference time Ts and the read elapsed time Tn. The predetermined reference time Ts may be set in advance. When the vehicle controller 30 determines that the elapsed time Tn is equal to or shorter than the reference time Ts, i.e., when a result of the determination made in step S34 is NO, the process returns to step S33. The vehicle controller 30 may thus repeat the foregoing control operation.

When the vehicle controller 30 determines that the elapsed time Tn from the time when the operation switch 10 has been pressed is longer than the reference time Ts, i.e., when the result of the determination made in step S34 is YES, the process may proceed to step S36. The vehicle controller 30 may therefore give the brake unit 20 the instructions for stopping the vehicle 90. This may activate the brake unit 20, causing the emergency stop of the vehicle 90 to be performed.

The control performed in the foregoing processes from step S32 to step S36 allows for execution of the emergency stop of the vehicle 90, when the operation switch 10 is kept being pressed for more than the predetermined reference time Ts. When a period of time during which the operation switch 10 is kept being pressed, i.e., the elapsed time Tn is equal to or shorter than the reference time Ts, the vehicle controller 30 may not activate the brake unit 20, and therefore may not perform the emergency stop of the vehicle 90. In other words, for example, when the operation switch 10 is pressed only for a moment, the vehicle controller 30 may not activate the brake unit 20, and therefore may not perform the emergency stop of the vehicle 90. This configuration makes it possible to avoid unintentional emergency stop of the vehicle 90 in a case such as a case where the operation switch 10 is pressed for a moment. Such pressing of the operation switch 10 for a moment may be attributed to a factor such as unintentional touching of the operation switch 10 by the occupant.

Figure 6:
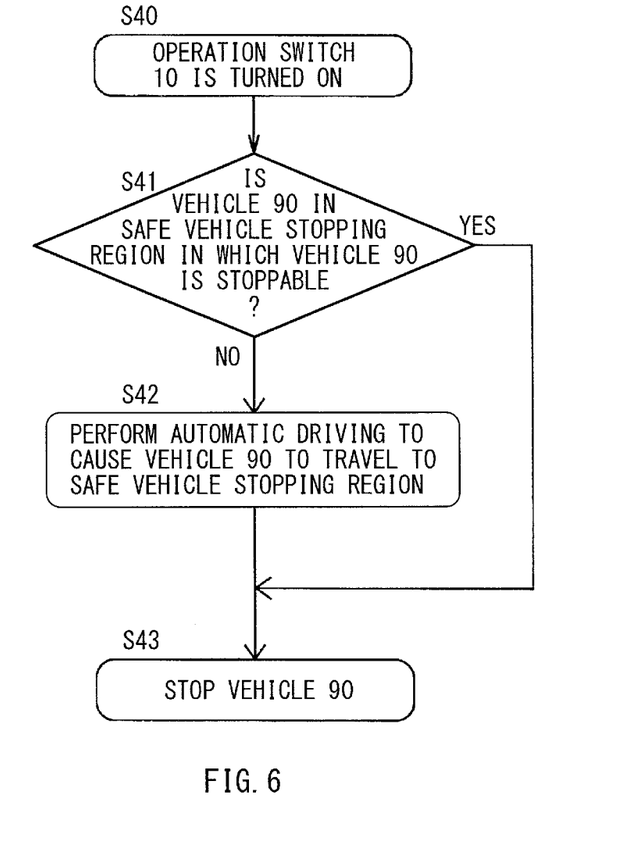
FIG. 6 is a flowchart illustrating another modification of the control operation of the vehicle stop apparatus according to one implementation of the technology.

FIG. 6 is a flowchart illustrating another modification of the control operation of the stop apparatus 1. Referring to FIG. 6, when the vehicle controller 30 detects that the occupant has turned on the operation switch 10 in step S40, the vehicle controller 30 may determine, in step S41, whether a current location of the vehicle 90 is in a safe vehicle stopping region on the basis of the information supplied from the devices such as the exterior environment recognizer 50. In other words, the vehicle controller 30 may determine whether it is possible to safely stop the vehicle 90.

When the current location of the vehicle 90 is in the safe vehicle stopping region, i.e., when a result of the determination made in step S41 is YES, the process may proceed to step S43. The vehicle controller 30 may therefore give the brake unit 20 instructions to stop the vehicle 90. As a result, the brake unit 20 may be activated, and a control for stopping the vehicle 90 may be performed.

In contrast, when the current location of the vehicle 90 is outside the safe vehicle stopping region, i.e., when the result of the determination made in step S41 is NO, the process may proceed to step S42. The vehicle controller 30 may therefore search for the safe vehicle stopping region near the current location of the vehicle 90, and perform the automatic driving to cause the vehicle 90 to travel to the searched safe vehicle stopping region. After the vehicle 90 arrives at the searched safe vehicle stopping region, the vehicle controller 30 may give the brake unit 20 the instructions to stop the vehicle 90 in step S43. As a result, the brake unit 20 may be activated to stop the vehicle 90. The stop apparatus 1 may perform the foregoing control, and thereby stop the vehicle 90 safely.

The stop apparatus 1 according to one implementation includes the brake unit 20, the operation switch 10, and the vehicle controller 30. The brake unit 20 stops the vehicle 90. The operation switch 10 is provided at a location that allows the operation switch 10 to be operable by the seated occupant of the vehicle 90 with the upper limb of the occupant. The vehicle controller 30 causes the brake unit 20 to stop the vehicle 90 in response to the input received by the operation switch 10. This configuration allows the occupant to promptly operate the operation switch 10 with his/her upper limb in the event of an emergency or any other situation, even when the occupant is away from the brake pedal, allowing for immediate stopping of the vehicle 90. As a result, it is possible to improve safety of the vehicle 90.

In particular, providing the operation switch 10 at a location that allows the operation switch 10 to be operable by not only the driver but also the fellow occupant with his/her upper limb allows also the fellow occupant to operate the operation switch 10 to thereby perform emergency stop of the vehicle 90. This configuration allows for stopping of the vehicle 90 based on determination, to stop the vehicle 90, of both the driver and the fellow occupant, i.e., of a plurality of persons, making it possible to further improve safety of the vehicle 90. Further, this configuration allows for the stopping of the vehicle 90 to be performed by pressing the operation switch 10 such as a button, making it possible even for the fellow occupant who has no skill or knowledge of driving to easily perform the operation of the emergency stop of the vehicle 90.

Moreover, the vehicle controller 30 may have the function of the automatic driving. Further, when the input received by the operation switch 10 is enabled at the time of the automatic driving, the brake unit 20 may be activated with the operation switch 10 at the time of the automatic driving, whereas the brake unit 20 may not be activated at the time when the automatic driving is not performed even the operation switch 10 being operated. This configuration allows for avoidance of activating the brake unit 20, for example, when the operation switch 10 is unintentionally operated at the time of the normal manual driving in which the driver performs the driving operation. This makes it possible to prevent unnecessary emergency stop of the vehicle 90 from being performed.

Moreover, the number of the operation switch 10 to be provided may be two or more. The vehicle controller 30 may perform the activation of the brake unit 20 upon detecting the input received by two or more of the operation switches 10. This configuration prevents the brake unit 20 from being activated when the vehicle controller 30 detects the input received by only one of the operation switches 10. This makes it possible to prevent unnecessary activation of the brake unit 20 attributed to an unintentional operation such as unintentional operation performed on the operation switch 10.

Moreover, providing the operation switch 10 on the armrest 41 of the seat 40 allows the occupant to promptly operate the operation switch 10 while placing his/her arm on the armrest 41. This configuration makes it possible to immediately stop the vehicle 90 in the event of an emergency and any other situation even when a part of the driver such as his/her leg and hand is sufficiently away from the members such as the steering and the pedals.

In other words, adopting the stop apparatus 1 according to one implementation of the technology that allows for safe stopping of the vehicle even when the driver is away from the members such as the brake pedal allows for setting of the arrangement of the seat. For example, the setting of the arrangement of the seat may include moving the driver's seat rearward at the time of the automatic driving. This makes it possible to improve an effect of reducing driver's fatigue.

Moreover, providing the operation switch 10 on the armrest 41 allows for the occupant to reflexively grasp the armrest 41 in the event of an emergency or any other situation, allowing the occupant to reflexively press the operation switch 10. In other words, this configuration allows the operation of the vehicle 90 to be performed utilizing the reflexive action of the occupant who senses a risk etc., making it possible to reflect the sudden movement of the occupant and thereby promptly stop the vehicle 90.

When the plurality of operation switches 10 are provided, the configuration in which one or more of the operation switches 10 are provided on an inner surface of the armrest 41 on an occupant side, and one or more of the rest of the operation switches 10 are provided on another surface of the armrest 41 allows for the one or more of the operation switches 10 provided on the inner side surface of the armrest 41 to be pressed with the thumb of the occupant and also allows for one or more of the rest of the operation switches 10 to be pressed with fingers of the occupant other than his/her thumb. Accordingly, by properly detecting the action of the occupant reflexively grasping the armrest 41 in the event of an emergency or any other situation, it is possible to promptly stop the vehicle 90.

Some examples of the control operation of the stop apparatus 1 have been described above with reference to FIGS. 4A to 6. However, the control operation of the stop apparatus 1 is not limited to the foregoing examples, and is variously modifiable. For example, a combination of the example of the control operation illustrated in FIG. 4B and the example of the control operation illustrated in FIG. 5 may be adopted. Such a combination may achieve a configuration in which the control directed to stopping of the vehicle 90 is performed only when the first operation switch 11 and the second operation switch 12 are pressed substantially together and both the first operation switch 11 and the second operation switch 12 are kept being pressed for more than the predetermined reference time Ts.

Moreover, when the operation switch 10 is pressed, a control may be performed to deactivate the automatic driving to thereby return to the manual driving, in addition to the control to perform the emergency stop of the vehicle 90.

The input received by the operation switch 10 may be set to be enabled to thereby execute the emergency stop of the vehicle 90, not limitedly at the time of the automatic driving but also at the time of the manual driving or any other state. In other words, the input received by the operation switch 10 may be enabled, for example, at the time of the manual driving or any other state. This configuration makes it possible, for example, for the occupant in the navigator's seat or the rear seat to operate the operation switch 10 to thereby perform the emergency stop of the vehicle 90, even at the time of the normal manual driving based on the driving operation performed by the driver. As a result, the occupant who senses a risk may perform the emergency stop of the vehicle 90 even when the driver is unable to perform an operation to avoid the risk for some reasons. This may make it possible to avoid occurrence of a further risk.

Described above is the example in which the control operation such as determination of various situations is performed by pressing the operation switch 10. However, the way of performing the control operation is not limited to the foregoing example. For example, the brake unit 20 may be activated immediately when the operation switch 10 is turned on, to thereby stop the vehicle 90. This makes it possible to stop the vehicle 90 immediately.

Upon activating the brake unit 20 to thereby stop the vehicle 90, the vehicle controller 30 may execute automatic steering driving together. The automatic steering driving may include avoiding an obstacle, for example. This makes it possible to safely stop the vehicle 90 while avoiding occurrence of an incident such as a collision by utilizing the automatic steering.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle stop apparatus, comprising:
   a brake that stops a vehicle;
   an operation switch provided at a location of the vehicle that allows the operation switch to be operable by an upper limb of a seated occupant of the vehicle; and
   a controller that controls an activation of the brake, the controller performing the activation of the brake in a response to an input received by the operation switch to cause the brake to stop the vehicle.

2. The vehicle stop apparatus according to claim 1, wherein the controller is capable of performing an automatic driving that allows starting of traveling, stopping of the traveling, acceleration, deceleration, and steering of the vehicle to be performed automatically, and wherein the input received by the operation switch is enabled while the automatic driving is performed by the controller.

3. The vehicle stop apparatus according to claim 1, wherein the operation switch comprises a plurality of operation switches, and
wherein the controller performs the activation of the brake upon detecting the input received by two or more of the operation switches.

4. The vehicle stop apparatus according to claim 2, wherein the operation switch comprises a plurality of operation switches, and
wherein the controller performs the activation of the brake upon detecting the input received by two or more of the operation switches.

5. The vehicle stop apparatus according to claim 1, wherein the vehicle comprises a seat and an armrest attached to the seat, and
wherein the operation switch is provided on the armrest.

6. The vehicle stop apparatus according to claim 2, wherein the vehicle comprises a seat and an armrest attached to the seat, and
wherein the operation switch is provided on the armrest.

7. The vehicle stop apparatus according to claim 3, wherein the vehicle comprises a seat and an armrest attached to the seat, and
wherein the operation switch is provided on the armrest.

8. The vehicle stop apparatus according to claim 4, wherein the vehicle comprises a seat and an armrest attached to the seat, and
wherein the operation switch is provided on the armrest.

9. The vehicle stop apparatus according to claim 5, wherein the operation switch comprises a plurality of operation switches,
wherein one or more of the operation switches are provided on an inner surface of the armrest on an occupant side, and
wherein one or more of the operation switches, other than the one or more of the operation switches that are provided on the inner surface of the armrest, are provided on a surface of the armrest other than the inner surface.

10. The vehicle stop apparatus according to claim 6, wherein the operation switch comprises a plurality of operation switches,
wherein one or more of the operation switches are provided on an inner surface of the armrest on an occupant side, and
wherein one or more of the operation switches, other than the one or more of the operation switches that are provided on the inner surface of the armrest, are provided on a surface of the armrest other than the inner surface.

11. The vehicle stop apparatus according to claim 7, wherein one or more of the operation switches are provided on an inner surface of the armrest on an occupant side, and
wherein one or more of the operation switches, other than the one or more of the operation switches that are provided on the inner surface of the armrest, are provided on a surface of the armrest other than the inner surface.

12. The vehicle stop apparatus according to claim 8, wherein one or more of the operation switches are provided on an inner surface of the armrest on an occupant side, and
wherein one or more of the operation switches, other than the one or more of the operation switches that are provided on the inner surface of the armrest, are provided on a surface of the armrest other than the inner surface.

13. The vehicle stop apparatus according to claim 1, wherein the operation switch is provided in a navigator's seat of the vehicle.

14. The vehicle stop apparatus according to claim 1, wherein the operation switch is provided in a rear seat of the vehicle.

15. The vehicle stop apparatus according to claim 1, wherein the operation switch is provided in a seat of the vehicle other than a driver's seat of the vehicle.

16. The vehicle stop apparatus according to claim 1, wherein the operation switch stops the vehicle independent of a brake pedal located in a front region of a driver's seat of the vehicle.

17. The vehicle stop apparatus according to claim 1, wherein the operation switch longitudinally extends in a front-rear direction of an extension of the vehicle.

18. The vehicle stop apparatus according to claim 1, wherein, in an automatic driving mode of the vehicle, in the response to the input received by the operation switch, the controller stops the vehicle.

19. A vehicle stop apparatus, comprising:
a brake that stops a vehicle in an automatic driving mode of the vehicle;
an operation switch located above a seat of the vehicle; and
a controller that controls an activation of the brake in a response to an input received by the operation switch to cause the brake to stop the vehicle.

20. The vehicle stop apparatus according to claim 19, wherein the operation switch is operable by an upper limb of a seated occupant of the vehicle.

* * * * *